United States Patent [19]
Bueser

[11] Patent Number: 5,402,817
[45] Date of Patent: Apr. 4, 1995

[54] PRESSURE REGULATOR FOR FUEL INJECTION SYSTEMS

[75] Inventor: Wolfgang Bueser, Tamm, Germany

[73] Assignee: Robert Bosch GmbH, Stuttgart, Germany

[21] Appl. No.: 230,408

[22] Filed: Apr. 20, 1994

[30] Foreign Application Priority Data

Apr. 20, 1993 [DE] Germany ............. 43 12 857.2

[51] Int. Cl.6 ............................. G05D 16/08
[52] U.S. Cl. ................... 137/116; 137/508; 137/549
[58] Field of Search .......... 113/459, 514; 137/115, 137/116, 508, 549

[56] References Cited

U.S. PATENT DOCUMENTS

| | | | |
|---|---|---|---|
| 3,235,085 | 2/1966 | Humbert | 137/116 X |
| 3,451,416 | 6/1969 | Nyberg | 137/116 |
| 3,606,908 | 9/1971 | Riester | 137/116 |
| 4,403,627 | 9/1983 | Bradley | 137/508 |
| 5,078,167 | 1/1992 | Brandt et al. | 137/549 |

FOREIGN PATENT DOCUMENTS 0491522  6/1992  European Pat. Off. .

Primary Examiner—Robert G. Nilson
Attorney, Agent, or Firm—Edwin E. Greigg; Ronald E. Greigg

[57] ABSTRACT

A pressure regulator including first and second chambers, separated by a diaphragm. By means of a tube centrally penetrating the diaphragm, fuel can be fed under pressure into a first chamber for delivery to an engine. The second chamber communicates with a fuel tank through a spillway and includes therein a compression spring of an overflow valve for diverting fuel from the tube. The overflow valve is embodied as a slide valve and includes a sleeve-like slide that is joined to the diaphragm and has a control opening that cooperates with a control groove of the tube. The pressure regulator for fuel injection systems is intended for disposition in or on a fuel tank so that any returned fuel is led directly into the tank.

10 Claims, 1 Drawing Sheet

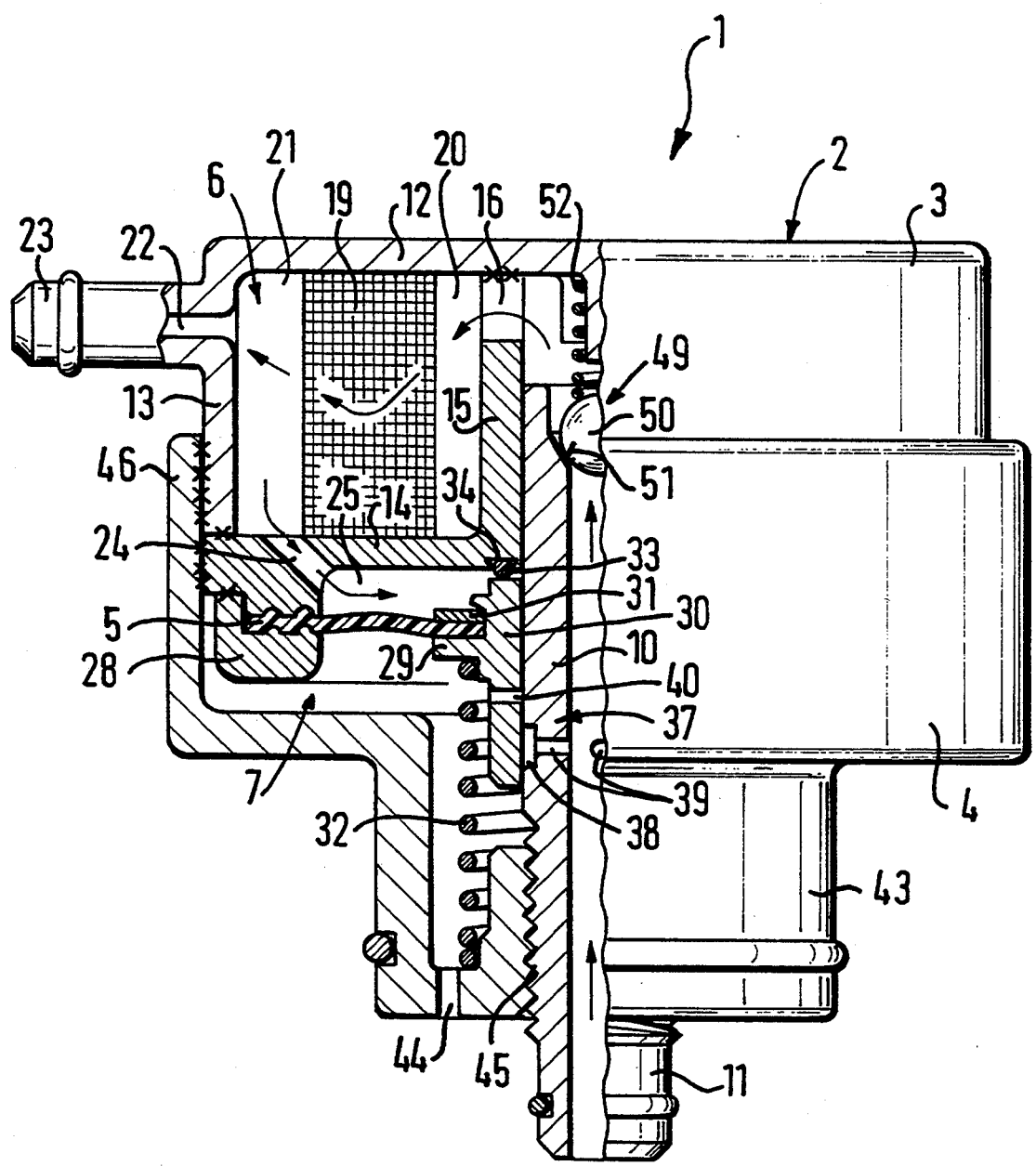

PRESSURE REGULATOR FOR FUEL INJECTION SYSTEMS

BACKGROUND OF THE INVENTION

The invention is based on a pressure regulator as defined hereinafter.

A pressure regulator of this kind for fuel injection systems of Otto engines, for disposition in or on a fuel tank, is already known from EP-A 0 491 522. This pressure regulator is distinguished by being disposed directly downstream of a fuel pump located in the tank, so that excess fuel pumped by the pump can be returned to the tank by a short route through the overflow valve. It is achieved thereby, in a simple manner, that only the portion of the pumped fuel intended for combustion in the Otto engine has to be subjected to filtration before being delivered to a distributor tube of the injection system. In this known embodiment, the overflow valve is embodied as a seat valve, whose valve seat is an axial collar of the tube and whose diaphragm-actuated closing member is a multiple-part holder guided coaxially on the tube and having an elastic sealing plate. This kind of overflow valve is relatively complicated in design. Moreover, the pressure regulator is complicated, being made up of numerous shaped sheet-metal parts, at considerable expense for manufacture and joining of the parts.

OBJECT AND SUMMARY OF THE INVENTION

The pressure regulator of the invention as defined has the advantage over the prior art that the overflow valve is distinguished by an extraordinary simple design, with only one moving component, in the form of the slide. The inevitable gap between the slide and the tube during fuel pumping is not a disadvantage, since excess fuel has to be diverted to the tank anyway.

A further feature of the invention is especially advantageous, because in a simple and reliable way the pressure in the downstream part of the injection system can be held constant over a relatively long period of time, and a return of hot fuel from the distributor tube back into the fuel tank, in which fuel that evaporates becomes polluting, can be averted.

Furthermore, the provisions set forth herein means that the connection with the fuel pump is also securely blocked off, so that an outlet valve embodied as a check valve at that location can optionally be dispensed with.

Another advantage is the design set forth because in this way, tensile and compressive forces are thus transmitted to the tube from the bottom and from the first housing part. This largely prevents bellying out of the end wall of the first housing part from the pressure of the fuel.

Another advantage of the design resides in the prestressing of the compression spring, which determines the set point of the pressure regulator, which is simply to adjust in the process of screwing the second housing part onto the tube, and on the other, the setting is durably secured by the materially joined connection. A dissipation of the forces originating in the compression spring to the tube is also attained here.

By a further provision because of the choice of material tuned to the joining process, considerable cost advantages in the manufacture of the pressure regulator are also attained.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the pressure regulator of the invention in simplified form.

DESCRIPTION OF THE PREFERRED EMBODIMENT

The pressure regulator 1 for fuel injection systems of Otto engines, which is shown in section in half of the drawing, has a can-shaped housing 2 with an upper, first housing part 3 and a lower, second housing part 4. The interior of the housing is subdivided into an upper, first chamber 6 and a lower, second chamber 7 by a diaphragm 5, firmly fastened to the outer edge.

A tube 10 penetrates the second chamber 7, engages the housing 2, and coincides with the vertically extending longitudinal axis of the housing for supplying fuel under pressure to the first chamber 6. On its segment protruding from the second housing part 4, the tube 10 is embodied as a connection piece 11 for the connection of a fuel pump, not shown, which is disposed in a fuel tank. The tube, centrally penetrates the diaphragm 5, ends in a region of the first chamber 6 at a distance from an end wall 12 of the first housing part 3.

In the first chamber 6, a bottom 14 extending at right angles to the longitudinal axis is inserted between the tube 10 and a circumferential outer wall 13 of the first housing part 3. The bottom 14 has a diameter corresponding to the diameter of the first housing part 3; and on the face end of the outer wall 13 remote from the end wall 12, it is joined to the first housing part 3 in a fuel-tight manner. The bottom 14 has a sleeve-like extension 15 in its middle, in which the tube 10 is tightly received, from the side of the second chamber 7. The extension 15 extends toward the end wall 12 of the first housing part 3 and is joined to this first housing part 3, leaving openings 16 for the passage of fuel.

An annular filter body 19 extends between the end wall 12 of the first housing part 3 and the bottom 14 is received in the first chamber 6 of the housing 2. This filter body divides a first, upstream chamber part 20 from a second, downstream chamber part 21 of the first chamber 6. The first chamber part 20 communicates with the opening 16; the second chamber part 21 has an outlet 22 in a connection piece 23 for connection to a distributor tube, not shown, of the fuel injection system. The second chamber part 21 also communicates, through a plurality of openings 24 in the bottom 14, with a third chamber part 25 of the first chamber 6 that is defined by both the bottom 14 and the diaphragm 5.

For securing the diaphragm 5 by its outer edge, a retaining ring 28 is provided. The diaphragm 5 is clamped interlockingly and by frictional engagement between the bottom 14 and the retaining ring 28, joined materially to the bottom, by suitable profiling of the facing ends of the two parts. The diaphragm 5 is tightly fastened in place by its inner edge between an annular disk 31 and a radially protruding collar 29 of a sleeve-like slide 30 received on the tube 10. The retaining annular disk 31 is joined to the slide 30 by a tight fit. The side of the collar 29 remote from the diaphragm 5 is engaged by a compression spring 32, received with prestressing in the second housing part 4. The compression spring 32 keeps the slide 30 in contact by its face end with an O-ring 33, which is received in a groove 34 at the bottom 14 concentrically surrounding the tube 10 toward the diaphragm.

The slide 30, disposed longitudinally movably with slight radial play on the tube 10, acts as a diaphragm-actuated closing member of an overflow valve 37 by which fuel can be diverted out of the tube 10 into the second chamber 7. The overflow valve 37, embodied as a slide valve, has a control groove 38 toward the tube 10 that communicates with the interior of the tube through radially extending bores 39. The control groove 38 cooperates with a control opening 40 of the slide 30, which is in the form of a radial bore and discharges into the second chamber 7.

The second housing part 4 enclosing the second chamber 7 is provided with a connection-piece-like segment 43, extending coaxially with the tube 10, for receiving the pressure regulator 1 in or on a fuel tank. Toward the bottom, the segment 43 is equipped with a plurality of spill openings 44 for letting the fuel, diverted into the second chamber 7, flow out to the tank. The segment 43 of the second housing part 4 communicates with a threaded segment 45 of the tube 10, while a jacket wall 46 of the second housing part 4 fits circumferentially over the bottom 14 and the outer wall 13 of the first housing part 3. In this region, the aforementioned components are tightly joined together materially.

The pressure regulator 1 is also equipped with a check valve 49 at the transition from the tube 10 into the first chamber 7. This check valve 49 has a closing member 50 in the form of a ball and a valve seat 51 formed by the end portion of the tube 10. The closing member 50 is urged in the closing direction by a closing spring 52 supported on the end wall 12 of the first housing part 3.

The assembly of the pressure regulator 1 is done by the following essential steps:

1. The tube 10 is joined to the extension 15 in the injection molding of the bottom 14, which is made of a thermoplastic plastic.
2. The filter body 19 and the parts of the check valve 49 are put in place, and the bottom 14 is joined to the first housing part 3, likewise made of thermoplastic plastic, by ultrasonic welding.
3. The diaphragm 5 is secured to the slide 30.
4. The O-ring 33 is inserted into the groove 34 of the bottom 14, and the slide 30 with the diaphragm 5 is slipped onto the tube 10.
5. The diaphragm 5 is secured by its outer edge to the bottom 14, by ultrasonic welding of the retaining ring 28 of thermoplastic plastic.
6. The compression spring 32 is placed on the slide 30.
7. The second housing part 4, with its connection-piece-like segment 43, is screwed onto the threaded portion 45 of the tube 10, until, in an adjustment procedure, the prestressing of the compression spring 32, supported on the inside on the segment 43, reaches the set point of the pressure regulator 1.
8. The second housing part 4, likewise of thermoplastic plastic, is welded ultrasonically to the bottom 14 and the first housing part 3.

The mode of operation of the pressure regulator 1 is as follows:

The fuel pumped from a tank by a fuel pump is fed under pressure into the tube 10 and after overcoming the check valve 49 reaches the first chamber part 20 of the first chamber 6. The fuel flows through the filter body 19 into the second chamber part 21 and from there through the outlet 22 into the distributor tube of the fuel injection system. Filtered fuel also passes through the openings 24 in the bottom 14 to reach the third chamber part 25 and builds up pressure above the diaphragm 5. As a result, the slide 30 undergoes a motion counter to the prestressing of the compression spring 32. When the system pressure of the injection system is reached, the overflow valve 37 is forced downwardly until the opening 40 reaches the opening 38, 39 to open the valve and unfiltered fuel is diverted into the second chamber 7, from which it can flow without pressure back into the fuel tank through the spill openings 44.

When the delivery of fuel is interrupted by the turning off the fuel pump, the check valve 49 closes. The slide 30 of the overflow valve 37 is also moved by the compression spring 32 toward the O-ring 33 on the bottom 14 and made to contact it. The first chamber 6 of the pressure regulator 1 is thus tightly blocked off.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pressure regulator (1) for fuel injection systems of Otto engines for disposition in or on a fuel tank, having the following characteristics:
    a can-shaped housing (2) is subdivided by a bottom (14) and a diaphragm (5) firmly fastened by its outer edge to the bottom (14) and to a sleevelike slide (30) by its inner edge, the bottom (14) and diaphragm divides the housing (2) into a first chamber (6) and a second chamber (7);
    a tube (10) is introduced into the housing (2) and penetrates the sleeve-like slide (30) for delivering fuel under pressure into the first chamber (6) which has an outlet (22) for the fuel;
    a compression spring (32) is received in the second chamber (7) and engages the sleeve-like slide (30) directly and at least indirectly engages the diaphragm (5) which counters a deflection of the diaphragm by fuel pressure;
    the sleeve-like slide is guided on the tube (10) and the diaphragm functions as a closing member of an overflow valve (37) and with said valve, fuel can be diverted from the tube (10) into the second chamber (7) and fed through a spillway (44) of the chamber into the fuel tank;
    the overflow valve (37) is embodied as a slide valve in which the sleeve-like slide (30) is joined to the diaphragm (5) and has at least one control opening (40), which cooperates with a control groove (38) of the tube (10) and discharges into the second chamber (7) and then returns to the fuel tank via opening (44).

2. The pressure regulator of claim 1, in which the sleeve-like slide (30) has a collar (29) on its circumference, to one side of which collar the diaphragm (5) is secured by its inner edge and on the other side of which the compression spring (32) is supported.

3. The pressure regulator of claim 1, in which said bottom (14) extends between the tube (10) and an outer wall (13) of a first housing part (3) and is inserted into the first chamber (6), and an annular filter body (19) is disposed between said bottom (14) and an end wall (12)

of the first housing part (3), said annular filter body forms a first upstream chamber part (20) and a second downstream chamber part (21), said second downstream chamber part communicates through openings (24) in the bottom (14) with a third chamber part (25), defined between said bottom (14) and said diaphragm (5).

4. The pressure regulator of claim 3, in which the bottom (14), toward the diaphragm includes a groove (34) that concentrically surrounds the tube (10) and a sealing ring (33) is placed in said groove (34), and the slide (30) is tightly supported on a face end against said sealing ring (33) by a prestressing force of the compression spring (32) during a delivery interruption of fuel.

5. The pressure regulator of claim 3, in which the tube (10) on an end portion toward the first chamber (6), has a valve seat (51) of a check valve (49), which blocks a return flow of fuel from said first chamber into the tube (10) and a closing member (50) of said check valve (49) is loaded by a closing spring (52).

6. The pressure regulator of claim 3, in which the diaphragm (5) is clamped by its outer edge between the bottom (14) and a retaining ring (28) materially joined to the bottom.

7. The pressure regulator of claim 3, in which the bottom (14) has in its middle, a sleeve-like extension (15), in which the tube (10), is received from a side of the second chamber (7) and includes openings (16) which discharge into the first and upstream chamber part (20) of the first chamber (6) and communicates with the end wall (12) of the first housing part (3).

8. The pressure regulator of claim 7, in which the bottom (14) is lockingly joined to an outer wall (13) and said extension (15) is materially joined to the end wall (12) of the first housing part (3).

9. The pressure regulator of claim 3, in which the housing (2) has a second housing part (4), which defines the second chamber (7) and has a connection-piece-like segment (43), that extends coaxially with the tube (10), with which said connection-piece-like segment the housing part (4) is screwed onto a threaded segment (45) of the tube; that the compression spring (32) is supported with prestressing on an inside portion of the connection-piece-like segment (43); and that the second housing part (4) is materially joined to the outer wall (13) of the first housing part (3).

10. The pressure regulator of claim 9, in which the first and second housing parts (3, 4) and the bottom (14) of the housing (2) comprise an ultrasonically weldable plastic.

* * * * *